Oct. 29, 1940.  J. BIJUR  2,219,290
LUBRICATION
Filed Oct. 9, 1934  2 Sheets-Sheet 1
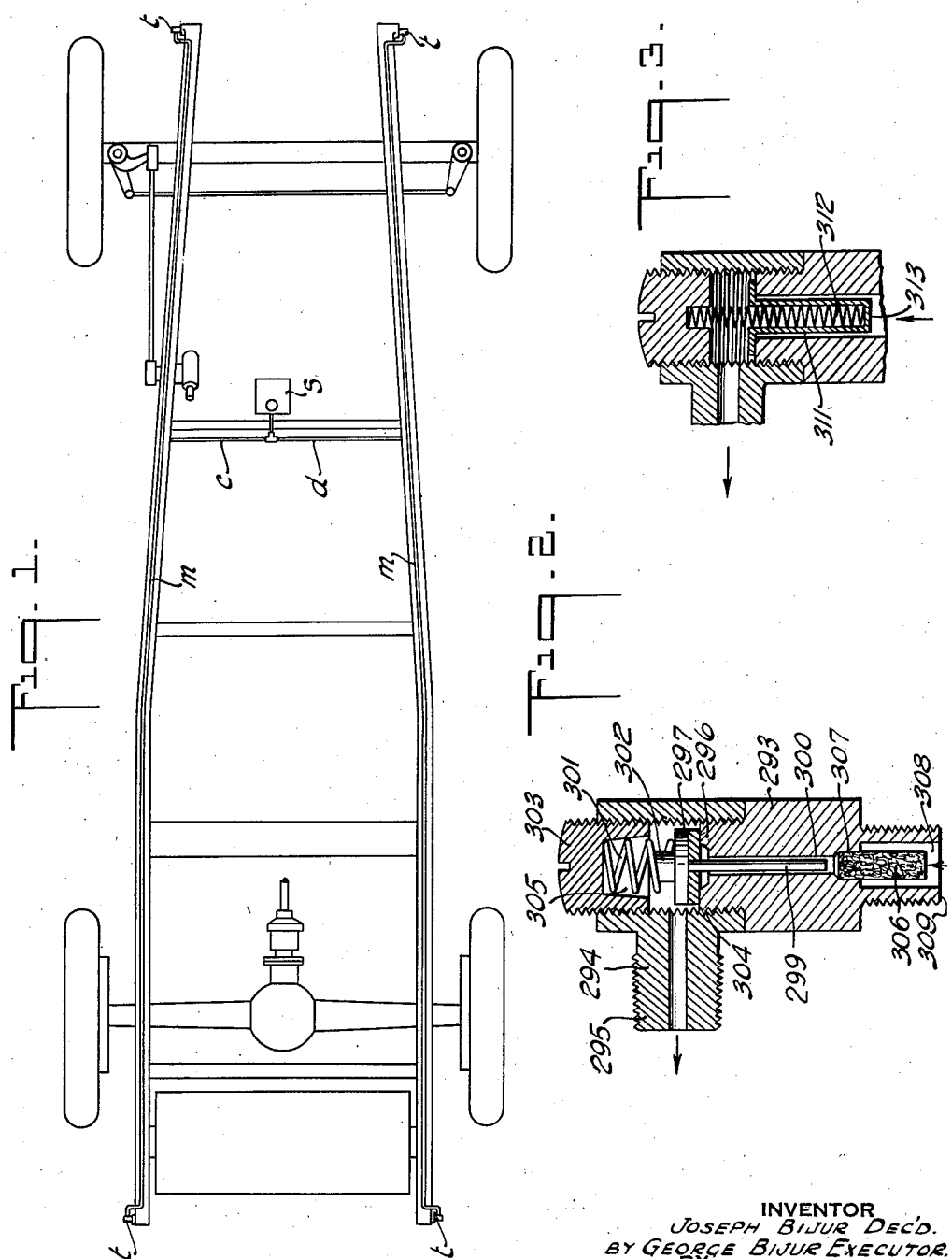
INVENTOR
JOSEPH BIJUR DEC'D.
BY GEORGE BIJUR EXECUTOR.
BY
Dean Fairbank Hirsch & Foster
ATTORNEYS Oct. 29, 1940. J. BIJUR 2,219,290
LUBRICATION
Filed Oct. 9, 1934 2 Sheets-Sheet 2
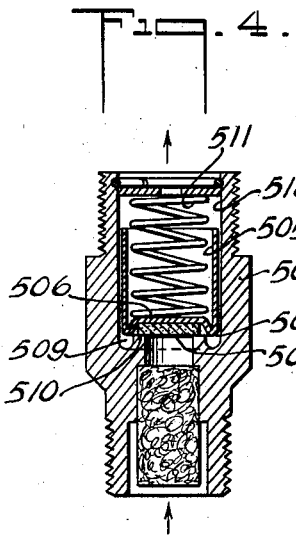
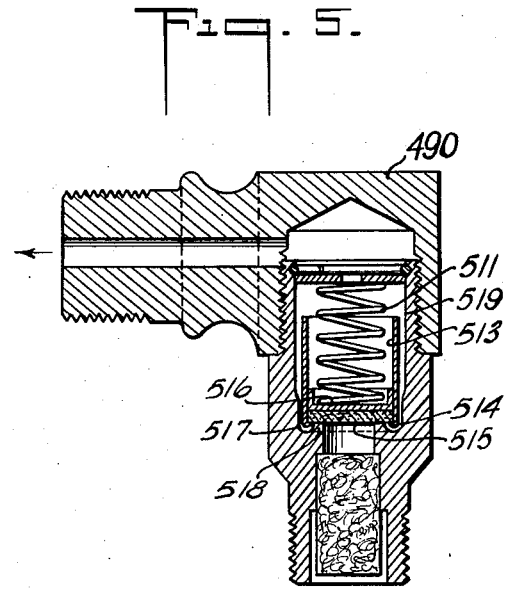
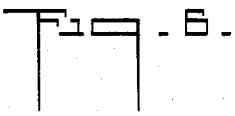
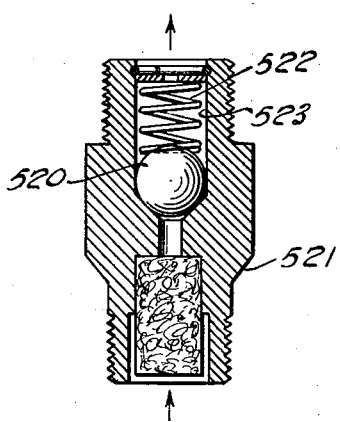
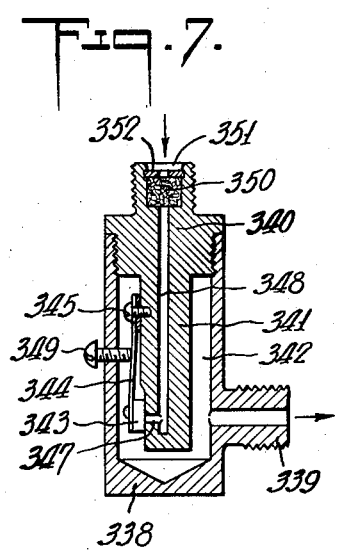
INVENTOR
JOSEPH BIJUR, DEC'D
BY GEORGE BIJUR EXECUTOR.
BY
ATTORNEYS Patented Oct. 29, 1940

2,219,290

UNITED STATES PATENT OFFICE 2,219,290

LUBRICATION

Joseph Bijur, deceased, late of New York, N. Y., by George Bijur, executor, New York, N. Y., assignor to Auto Research Corporation, a corporation of Delaware Application October 9, 1934, Serial No. 747,497

10 Claims. (Cl. 184—7)

The present invention relates primarily to central lubrication and is more especially concerned with valving and/or metering flow control devices, for example, of the general type disclosed in issued Patent No. 1,632,772 of June 14, 1927, and known as "drip plugs," the flow rating of which is not subject to fortuitous variation.

In designing full metering devices of the flow restriction type disclosed in Patent No. 1,632,772, it is customary to provide separate valve and restriction elements, the restriction end being preferably relatively fixed in position and the valve being positioned in an outlet socket and enclosed between a valve seat and a valve retainer. The socket may be a large one to receive a coil spring for seating the valve, or a relatively small one with springless valves.

It is an object of the present invention, however, to provide a flow metering device or drip plug of the type above described in which the valve and the restriction shall constitute one unit and in which the valve and drip plug may move together and/or be retained in a single cavity or enclosed in the drip plug fitting.

Another object is to provide a flow metering device or drip plug fitting of the type above described, the flow restricting effect of the valve being correlated with the flow restricting effect of the restriction to give a unit of a desired rating.

The objects of the present invention are accomplished either by forming a restriction around the edge of the valve so that the lubricant will both have to unseat the valve and will be restricted in flowing around the valve when it is forced through the drip plug under pressure, or the valve may be provided with an elongated extension fitting into a closely enclosed bore, and thereby forming a restricted annular passage.

This application is a continuation in part of copending application Serial No. 580,668, filed August 9, 1922, now Patent No. 1,975,920.

In the accompanying drawings in which are shown one or more of various possible embodiments of the several features of the invention:

Fig. 1 is a diagrammatic view indicating the application of the fitting to a chassis.

Fig. 2 is a transverse sectional view on a larger scale showing the construction of one embodiment of the fitting.

Fig. 3 is a view similar to Fig. 2 of another embodiment of drip plug, and

Figs. 4, 5, 6 and 7 are views similar to Figs. 2 and 3 of still other embodiments.

Referring now to the drawings, in Fig. 1 there is shown diagrammatically the general layout of the chassis of an automobile having a lubricant supply unit S, illustratively on the dashboard. The distributing system includes headers $c$ and $d$, which communicate at their ends with the respective mains $m$ extending the length of the channel frames and feeding various bearings at or near which the drip plug terminals $t$ are applied. Bridging conduits (not shown) are provided leading to similar drip plugs (not shown) at or near the corresponding bearings on the axle or other unsprung parts.

In Fig. 2 the fitting comprises a cartridge or shell 293 for the seepage resistance threaded into and supported by a transverse retaining support sleeve 294 formed integral with a nipple 295 for application to the bearing box, bolt or other element to be supplied with lubricant, although obviously the nipple and cartridge element may be formed of an integral piece. The cartridge 293 has an annular seat 296 at its inner end for a valve 297. The valve has a stem 299 rigid therewith, extending longitudinally through the corresponding bore 300 in the fitting. In the preferred embodiment, the stem is of diameter in the neighborhood of .002″ smaller than that of the bore.

The valve is normally maintained upon its seat by a coil spring 301 encircling a central stud 302 integral with the valve head and maintained under compression by a screw plug 303 threaded into the end of the tapped opening 304 in the retaining sleeve 294 and having a depression 305 within which the coil spring seats.

In the intake end of the cartridge is placed the filter plug 306 of felt, cotton, or similar porous material; a short length of which fits snugly without appreciable compression within the somewhat enlarged end of the bore 307 adjacent the end of the valve stem, said plug having a portion projecting outward into a passage 308 of larger diameter in the end of the cartridge to expose the lateral surface of the plug. The fitting is threaded at its end 309 for application of the conduit pipe.

In operation when the pressure in the pump subsides, so that the sum of the pressures exerted upon the end of the valve stem and the lower surface of the valve head is no longer sufficient to overcome the counterpressure of the spring 301, the latter forces the valve 297 against its seat and prevents further flow. It will thus be seen that the valve 297 with its stem 299 performs the combined function of a seepage resistance to absorb pressure in the line and of a valve to maintain the line closed against escape of lubricant and entry of air when the pump is not under pressure.

By adjusting the compression plug 303 of any one of the fittings in an installation, the counterpressure of the coil spring 301 thereof may be increased or decreased to decrease or increase the rate of lubricant flow to the corresponding bearing.

It will be seen that if the counterpressure of the spring is increased, the valve will reseat against the opposition of a higher residual oil pressure to interrupt the flow of lubricant, while if it is decreased, reseating will occur only after the oil pressure has dropped sufficiently to be overcome by the lesser spring pressure. With various seepage fittings of the type shown in Fig. 2 adjusted to deliver various amounts of lubricant when fed from a common source, the distribution of oil to the various bearings will proceed at the desired rate throughout the slowly executed pump discharge stroke.

Thus, a charge of oil from the pump may be distributed to the bearings in a lubricating installation either alike to each bearing or otherwise as desired, by appropriate setting of the compression plugs 303, and adjustment may be readily effected in the compression plug of any fitting to regulate its flow if the bearing receives too much or too little oil, and this without in any way interfering with the rate of feed through the other fittings.

In Fig. 3 is shown a modification of the fitting of Fig. 2 in which the valve stem is formed of a single blank of pressed metal having a hollow stem 311, a long counterpressure spring 312 being employed, extending into the hollow stem 311 and reacting against the closed end 313 thereof.

In Fig. 4 is shown another form of seepage or drip plug fitting in which the seepage resistance is a part of the valve structure. The support fitting element corresponding to 490 in Fig. 5 is not shown here and would ordinarily be supplied in use, for attachment to a bearing structure, but may be omitted, in which case, the cartridge 504 is directly threaded into the bearing or bolt.

In this embodiment, the valve includes a cylindrical metallic tube 505 having an integral countersunk closed end 506 against the outer face of which fits the flexible seating portion 507, the rim 508 of the end 506 extending, when the valve is seated, into a trough 509 in the fitting about the valve seat 510. The valve closing spring 511, as shown, extends into the tube against the end 506.

Preferably the outer diameter of the tube 505 is in the neighborhood of but .001 inch smaller than the bore 512 of the fitting, so that, in operation, the pressure in the lubricant is absorbed in passing through the small cylindrical crevice between the tube and the bore. In this embodiment, it will be seen that the lubricant forced between the fitting bore 512 and the valve tube 505 therein through the intermediate seepage crevice, tends by frictional resistance to draw said valve along in the direction of flow, and thus aids to overcome the resistance of the valve seating spring 511, as distinguished from other constructions, shown in application Serial No. 580,668, filed August 9, 1922, in which the frictional resistance of the restriction to flow, has no effect in maintaining the valve from its seat.

In the embodiment of Fig. 4, therefore, a stronger valve seating spring may be used for a given pump pressure, since the lubricant pressure absorbed in the seepage resistance in this case, becomes effective in raising and maintaining the valve raised from its seat while pressure is applied.

The valve 507 will, therefore, be raised under pressure for a substantial distance from its seat, so that the resistance to flow in the fitting is substantially entirely in the minute crevice between the fitting bore and the relief valve tube therein.

Fig. 5 is an embodiment structurally generally similar to Fig. 4. In this embodiment, the lower end of the cylindrical tube 513 is swaged as at 514 over the periphery of the lower surface of the valve seating portion 515 and the latter is maintained tightly jammed in place within the tube 513 by a flanged friction plate 516 therein.

In this embodiment, the length of the fitting bore 517 adjacent the valve seat 518 is about .001 inch larger in diameter than tube 513 affording a corresponding minute annular crevice about the valve. At a distance of a small fraction of an inch from said valve seat, the fitting bore is widened somewhat as shown at 519 to afford a diameter, preferably about .002 inch larger than that of the valve tube 513, for a purpose which will appear in the operation now to be set forth.

In operation, with the usual grade of oil, when the weather is not cold, the application of the pump discharge pressure will effect opening of the valve 515 to an extent sufficient to permit the slow flow of oil through the high resistance seepage crevice near the seat 518 of the fitting. The operation proceeds substantially as in the embodiment of Fig. 4.

In cold weather, when the oil becomes so viscous that it cannot flow through the minute crevice near the seating end of the fitting, the pressure transmitted through the lubricant becomes effective to bodily move the valve 515 from its seat into the enlarged bore portion 519 of the fitting.

The effective crevice being thus materially enlarged in cross-sectional area, the viscous oil can flow therethrough on its way to the bearings. It is particularly to be noted that the enlargement of the bore is merely sufficient to permit slow flow of the more viscous oil without pressure relief. Thus, the seepage fitting described, responds automatically to high pressure delivered through highly viscous oil to decrease the resistance to flow sufficiently to permit flow of the viscous lubricant without relief of pressure and after completion of the discharge, the spring 511 returns the valve to its seat 518.

In Fig. 6 is shown another embodiment of seepage fitting, like that of Figs. 4 and 5, embodying a cartridge fitting element generally similar to that shown in Figs. 4 and 5, except that instead of a disk or cylinder valve, there is employed a spherical or ball valve and seepage resistance.

The ball 520 is urged against its seat by a spring 522 and is located in a cylindrical bore 523 in the fitting of diameter so little larger than that of the ball that upon the application of pressure to the lubricant and unseating the valve, the crevice for oil flow between the bore and the ball is so minute that the pressure is not relieved and the oil is forced past the ball in the desired slow drop by drop movement.

It will be noted, more particularly in the embodiments of Figs. 4, 5 and 6, that the closure valve and the restricting element fitting the cartridge bore to form the seepage resistance are either one and the same element or are connected to form a unitary structure.

As an operational consequence, the lubricant in passing through the minute restriction, as already suggested in the description of Fig. 4 above, tends to draw or drag the restricting member along with it, thereby aiding in maintaining the connected valve open against the resistance of the spring, which tends to reseat it.

Since in this embodiment the seepage resistance in operation assists in maintaining the valve open, it is feasible with a given pump discharge pressure, to use a stronger valve seating spring than in embodiments in which the seepage resistance does not coact in operation to hold the valve from its seat.

It is, of course, understood that any of the various seepage or drip plug constructions described may be used on any lubricating line or the installation may be equipped at various parts with fittings of different design. It will also be understood that the various distinctive parts of various fittings may be in many cases interchangeably used in other forms of fittings.

The fitting of Fig. 7 is closed at one end 338 and has an integral nipple 339 for application to the bearing or bolt. A metal plug 340 is threaded into the open end of said fitting and has a shank 341 within the chamber 342 fitting. A valve 343 mounted upon one end of a leaf spring 344, the other end of which is secured by means of a screw 345 to the shank 341 of the plug, closes the cross passage 347 communicating with the axial duct 348 through the plug. The leaf spring is preferably set to urge the valve closed with a substantial minimum pressure and screw 349 accessible from the exterior of the fitting affords additional adjustable valve seating pressure. A filter plug 350 is preferably seated within a depression 351 in the end of plug 340 and is maintained in place by a spring washer 352 snapped into a corresponding groove.

The leaf spring 344 and screw 349 exert a valve seating pressure of such magnitude that the lubricant forced past the filter plug into the seepage fitting by the operation of the pump will unseat the valve but slightly to leave but a minute crack between the valve and its seat, affording a highly constricted passage for the lubricant, the pressure being frictionally absorbed as the oil oozes slowly therethrough. The slow feed of lubricant takes place until the counterpressure of the spring and screw overcome the pressure in the line when the valve 343 closes to prevent further exit of lubricant. Adjustment of flow to any bearing can be effected through screw 349.

In this embodiment, it will be seen that valve 343 also performs the combined function of a seepage resistance to absorb the pressure in the lubricant, and a valve to prevent leak of oil or entry of air.

The flow metering devices of the present application are designed to be utilized in flow metering systems having a central pump either continuously or intermittently feeding the system with the amount of lubricant required, which pump may be automatically actuated as by the intake manifold vacuum, an inertia weight, direct mechanical drive, and by other arrangements. The outlet fittings should preferably have a predominating restricting effect, as compared to the piping line and the bearings, the preferred drip plug devices having a restricting effect ranging between 50 to 200 the restricting effect of the longest line and the tightest bearing, an exact rating of which outlet device being controlled to proportion the correct amount of lubricant to the bearing to which it is connected.

Figs. 2, 3, 4, 5, 6 and 7 correspond respectively to Figs. 23, 23a, 43, 44, 45 and 26 of the parent application, Serial No. 580,668, and Fig. 1 is a simplified showing of and is based on Fig. 1 of the prior application, Serial No. 580,668.

In said prior application, Serial No. 580,668, which has matured into Patent 1,975,920, there is a full disclosure of the valve retainer which holds the springs 511 of Figs. 4 and 5 and 522 of Fig. 6 at page 5, lines 15 to 21 of said patent, where it is stated that the retainer consists of a polygonal washer which is maintained in place within the bore of the fitting by a split ring fitting in a groove. It is thus apparent that even though the elements 505 of Fig. 4, 513 of Fig. 5 and 520 of Fig. 6 are thrown to the end of their stroke in the direction of lubricant flow, as indicated by the arrows, the lubricant will still feed through the fitting.

The valve fittings of the present application, particularly those shown in Figs. 4 and 5, are to be distinguished from measuring valves as of the type illustrated in the Locke and Dosch patents, Reissue 18,450, 1,542,311 and 1,847,434, in which patents, as shown in Figs. 12 to 14, there are piston devices which, by means of their reciprocation, first open a chamber to the inlet, while closing it from the outlet and then close it from the inlet, while opening it to the outlet, with the result that a charge of lubricant, which is received from the chamber, may run to the bearings. In the present application on the other hand, throughout the duration of pressure when the valve has been unseated, the oil or lubricant will slowly feed through a narrow crevice of the order of some thousandths of an inch throughout the period of pressure application and feed will promptly cease after the pressure application has ceased, as contrasted to a measuring valve construction in which the feed takes place usually after the pressure application, when the valve has returned, opening the measuring chamber to the outlet. As is stated in the parent application Patent No. 1,975,920, the high resistance to lubricant flow afforded in the crevice will permit oil to ooze only slowly, drop by drop, to the bearing, upon application of a substantial working pressure to the oil. In the devices shown the valve will usually balance between extreme positions when the springs 511, 522 and so forth have been compressed or tensioned sufficiently to balance the pressure drop across or through the restriction crevice.

By the expression "drip plug" as utilized in the specification and accompanying claims is meant a high restriction metering fitting which affords a substantial constant obstructing effect much higher than the obstructing effect of the piping or tubing and the bearings and which will substantially prevent lubricant flow except under applied pressure. These obstructing devices usually consist of fittings provided with central flow passages which are obstructed by filler members affording a very small crevice or capillary passages through which the lubricant must flow in passing to the bearing.

What is claimed is:

1. As an element in a lubricating installation having piping leading to bearings, a pipe fitting for application in a lubricant supply line adjacent the bearing to be lubricated, said fitting having a valve normally seated to prevent leak from the line and an obstruction in said fitting, rigid and moving with said valve, and affording a high resistance to lubricant flow materially greater than the opposition of said valve to lubricant flow and greater than the resistance normally encountered in the installation due to the piping and the bearings.

2. A flow control fitting comprising a reciprocatory valve, a seat for said valve, said fitting being provided with a passage closely fitting said valve in its reciprocating movement and forming a very narrow annular passage having a very high flow metering restricting effect at all points in the reciprocatory movement of the valve, resilient means pressing said valve against said seat and adjustable means to regulate the seating pressure of said spring, said valve serving both to check return flow and restricting forward flow to a predetermined degree.

3. A lubricant flow control device comprising a body having a cylindrical passage, a valve member, said valve member restricting the flow of lubricant through the device, and a cylindrical member rigidly connected with said valve member, closely fitting in said passage, said passage affording varying restriction at different portions thereof, and means causing said cylindrical member to move into portions of greater restriction with decreased lubricant viscosity and into portions of lesser restriction with increased lubricant viscosity, thereby affording a great resistance with decreased lubricant viscosity and a decreased resistance with increased lubricant viscosities.

4. A lubricant flow control fitting having an elongated body, a threaded flow connection at the side thereof, a second threaded flow connection at one end thereof, a cylindrical bore in the body and a spring seated valve having an elongated cylindrical portion closely fitting said bore, said bore being provided with portions of varying diameter, so arranged that the valve will move into portions of increased dimension on large movements and into portions of decreased dimension on small movements.

5. A lubricant flow control fitting affording a high restricting effect against the flow of lubricant therethrough comprising a casing having a central bore and inlet and outlet connections to said bore, one end of said bore being provided with a stop shoulder, an elongated cylindrical member in said bore, being of such smaller diameter than said bore as to form a very narrow annular crevice of the order of thousandths of an inch giving rise to said restricting effect, said member being reciprocable in said bore and said member being provided with a terminal transverse flange to contact with said stop shoulder and also being provided with a coil spring to bias said member toward one end of said bore and to cause said flange to contact with said stop shoulder, said member being moved toward the other end of said bore and said flange being moved off said stop shoulder upon application of substantial lubricant pressure to said inlet connection, said crevice permitting only slow continuous feed of lubricant and being continuously open to flow of lubricant upon application of substantial lubricant pressure, said fitting being of such high restricting effect as in itself to control proportionment of the lubricant in a centralized lubricating installation of the type having an elongated distributing piping system substantially completely filled with lubricant and leading to the bearings to be lubricated, said restricting effect being tremendously greater than the restricting effect of the piping and bearings, and being so high as to permit only slow flow of lubricant under substantial pressure application applied through the column of the lubricant in the piping and also so high as to prevent substantial gravity flow.

6. A flow proportioning control outlet valve to connect an outlet of a piping system to a bearing to be lubricated, said control outlet valve including a fitting having a recess receiving a reciprocating valve member and a seating spring for said valve member, one end of said recess being formed as a seat against which said spring normally presses said valve to close said outlet, said valve when forced from said seat by lubricant pressure application from said pump forming a small dimension restriction passage in respect to said recess, the end of said recess being closed by a cup member to receive the other end of said spring than presses against said valve, the rating of said control valve being determined by the strength of said spring, said valve permitting slow continuous feed of lubricant through said restriction passage upon pressure application sufficient to unseat said valve throughout duration of said pressure application, said valve when opened under said pressure application affording a much higher restricting effect upon the flow of lubricant than is encountered in the piping system and in the bearings.

7. A flow control outlet including a fitting provided with a recess, one end of which recess is formed as a valve seat and the other end of which recess is provided with a retainer, said recess receiving a metallic valve and a coil spring reacting between said valve and said retainer, said spring tending to press said valve against said seat, said valve, when unseated by pump pressure, forming a small dimension restriction passage in respect to said recess, which small dimension restriction passage has a predominating effect upon the flow of oil and a tremendously higher resistance than the resistance of the piping system and the bearings, the rating of said fitting being determined by the strength of said spring, said passage permitting slow continuous feed of lubricant, drop by drop, throughout the time said valve is unseated by the pump pressure.

8. A lubricant flow control fitting having an elongated body, a threaded flow connection at the side thereof, a second threaded flow connection at one end thereof of a cylindrical bore in the body and a spring seated valve having an elongated cylindrical portion closely fitting said bore leaving a crevice of some thousandths of an inch which will be continuously open when said valve is unseated to permit slow continuous feed of lubricant to a bearing, said passage having a tremendously higher restricting effect than the bearing so as to predominantly control the proportionment of lubricant, said valve being provided with a plate at one end thereof transverse to said elongated cylindrical portion and said bore being provided with a seat at one end thereof for said plate.

9. A lubricant flow control fitting comprising a casing having a central bore, inlet and outlet connections to said casing and to said bore and a restriction element in said casing, said restriction element including a disk valve and a spring to bias said valve in one direction, and an elongated cylindrical member secured to said disk valve and fitting in said bore to form a highly restricting annular passage through said bore between said cylindrical member and said bore, said annular passage being continuously open when said disk valve is unseated to afford a high restriction passageway for the lubricant which will permit only slow seepage of the lubricant upon substantial pressure application.

10. A flow control fitting device comprising a valve and a restriction, said device being provided with an enlarged cavity to receive said valve and with a bore of diameter only slightly greater than the external diameter of the restriction to form a high resistance annular lubricant passageway, said restriction being rigidly connected to said valve, said annular lubricant passageway being continuously open when substantial pressure is applied to the control fitting device to permit slow feed of oil throughout the duration of pressure application.

GEORGE BIJUR.
*George Bijur, Executor of the Estate of Joseph Bijur, Deceased.*